United States Patent
Steinebach et al.

(10) Patent No.: US 10,788,505 B2
(45) Date of Patent: Sep. 29, 2020

(54) METHOD FOR MONITORING SLIDING CONTACTS

(71) Applicant: Siemens Healthcare Diagnostics Products GmbH, Marburg (DE)

(72) Inventors: Wolfgang Steinebach, Salz (DE); Christian Verhalen, Wiesbaden (DE)

(73) Assignee: Siemens Healthcare Diagnostics Products GmbH, Marburg (DE)

( * ) Notice: Subject to any disclaimer, the term of this patent is extended or adjusted under 35 U.S.C. 154(b) by 503 days.

(21) Appl. No.: 15/638,286

(22) Filed: Jun. 29, 2017

(65) Prior Publication Data

US 2018/0003731 A1    Jan. 4, 2018

(30) Foreign Application Priority Data

Jul. 1, 2016   (EP) ..................... 16177472

(51) Int. Cl.
*G01N 35/02*   (2006.01)
*G01N 35/00*   (2006.01)
(Continued)

(52) U.S. Cl.
CPC ....... *G01N 35/025* (2013.01); *G01N 35/0099* (2013.01); *G01N 35/00871* (2013.01);
(Continued)

(58) Field of Classification Search
CPC .......... A61B 6/56; A61B 6/563; A61B 6/566; G02C 7/04; G01N 21/17; G01N 35/025; G01N 2035/0439; G01N 2035/0441; G01N 2035/0443; G01N 2035/0444; G01N 2035/0446; G01N 2035/0448;
(Continued)

(56) References Cited

U.S. PATENT DOCUMENTS 3,883,305 A * 5/1975 Hoskins ................. G01N 35/02
                                                    422/65
4,234,538 A * 11/1980 Ginsberg ............. G01N 21/253
                                                    250/226
(Continued)

FOREIGN PATENT DOCUMENTS

DE    102009043524       3/2011
WO    WO 9108463 A2     6/1991

OTHER PUBLICATIONS

European Search Report of European Application No. 16177472.4-1553 dated Jan. 9, 2017.

*Primary Examiner* — Steven L Yeninas
(74) *Attorney, Agent, or Firm* — Dugan & Dugan, PC

(57) ABSTRACT

A measuring system for measuring a sample in an automated analysis machine comprises a measuring device for recording measurement values of a measured variable and a first controller and a second controller for processing the measurement values and a sliding contact system with sliding contacts, wherein the measurement values are transferred from the measuring device to the first controller and wherein the measurement values are transferred from the first controller to the second controller via the sliding contacts. The measuring system comprises an error counter which captures the errors occurring during the transfer of the measurement values from the first controller to the second controller via the sliding contacts.

20 Claims, 2 Drawing Sheets

(51) Int. Cl.
*H04L 12/40* (2006.01)
*G01N 35/04* (2006.01)
*G01N 21/17* (2006.01)
*G02C 7/04* (2006.01)

(52) U.S. Cl.
CPC ........ *H04L 12/40* (2013.01); *H04L 12/40013* (2013.01); *G01N 21/17* (2013.01); *G01N 2035/0439* (2013.01); *G02C 7/04* (2013.01); *H04L 2012/40215* (2013.01)

(58) Field of Classification Search
CPC ...... G01N 2035/0449; H04L 12/40013; H04L 2012/40215; G01R 31/34; G01R 31/343; H02K 13/003; H01R 39/08; H01R 39/085; H01R 39/10; H01R 39/12; H01R 39/24; H01R 39/26; H01R 39/58; H01R 39/64
USPC ....... 324/538; 382/309; 422/63, 64; 310/232
See application file for complete search history.

(56) References Cited

U.S. PATENT DOCUMENTS

| | | | |
|---|---|---|---|
| 5,089,229 A * | 2/1992 | Heidt | G01N 35/00029 422/63 |
| 8,148,163 B2 * | 4/2012 | Hofstadler | G01N 35/0098 422/50 |
| 2007/0067678 A1 * | 3/2007 | Hosek | G07C 3/00 714/25 |
| 2007/0189323 A1 | 8/2007 | Swoboda et al. | |
| 2008/0085131 A1 * | 4/2008 | Kitazawa | G03G 15/0266 399/48 |
| 2008/0170464 A1 * | 7/2008 | Murakami | B01F 11/0266 366/113 |
| 2011/0060855 A1 | 3/2011 | Kuschke et al. | |
| 2011/0076199 A1 | 3/2011 | Meller et al. | |
| 2014/0120521 A1 | 5/2014 | Abi-Samra et al. | |
| 2014/0201571 A1 * | 7/2014 | Hosek | G06F 11/2257 714/26 |
| 2015/0303633 A1 * | 10/2015 | Altieri | B64C 27/32 307/104 |
| 2016/0359707 A1 * | 12/2016 | Martin | H04L 5/006 |

* cited by examiner

METHOD FOR MONITORING SLIDING CONTACTS

CROSS REFERENCE TO RELATED APPLICATION

This claims priority to European Patent Application No. EP 16177472.4, filed Jul. 1, 2016, which is hereby incorporated by reference herein in its entirety for all purposes.

FIELD

The invention lies in the field of the automated in vitro diagnostic systems. The subject matter of the invention is a measuring system for measuring a sample, and a method for monitoring sliding contacts in an automated analysis machine.

BACKGROUND

These days, numerous detection and analysis methods for determining physiological parameters in bodily fluid samples or other biological samples are performed in a large number and in an automated manner in automated analysis machines, also so-called in vitro diagnostic systems.

Current analysis machines are able to perform a multiplicity of detection reactions and analyses using one sample. In order to be able to perform a multiplicity of examinations in an automated manner, various apparatuses for the spatial transfer of measurement cells, reaction containers and reagent containers are necessary, such as, e.g., transfer arms with a gripper function, transport belts or rotatable transport wheels, as are apparatuses for transferring liquids, such as, e.g., pipetting apparatuses. The machines comprise a control unit which, by means of appropriate software, is able to plan and work through the work steps for the desired analyses in a largely independent manner.

Many of the analysis methods used in such analysis machines operating in an automated manner are based on optical processes. These methods render possible the qualitative and quantitative detection of analytes, i.e., the substances in samples to be detected or determined. Clinically relevant parameters, such as, e.g., the concentration or activity of an analyte, are often determined by virtue of part of a sample being mixed with one or more test reagents in a reaction vessel, which can also be the measurement cell, as a result of which, for example, a biochemical reaction or a specific binding reaction is initiated, which brings about a measurable change of an optical or other physical property of the test run.

Automated analyzers, which are used to examine biological bodily fluids, comprise different machine components for processing the sample. By way of example, the required reagents are filled into a measurement cuvette by means of a pipetting apparatus with a pipetting needle. Here, the measurement cuvette is automatically displaced by means of a robotic arm to various positions within the automated analysis machine by means of a cuvette gripper, with said robotic arm being part of a robotic station. After the measurement, the used measurement cuvette is brought through a waste chute into a waste container, for example, for disposal purposes.

Known automated analysis machines comprise an apparatus for the photometric examination of samples. By way of example, it has a sample holding device for at least two sample vessels and a measuring device and a movable device. Here, the sample holding device has a stationary embodiment and the measuring device is arranged on the movable device such that it is displaceable relative to the sample holding device by means of the movable device. Such an apparatus is described in DE 102009043524 A1 and has, inter alia, the advantage that reagents may be pipetted continuously into the sample vessels during the measurement.

It is of particular importance in the above-described apparatus that the transfer of data and/or an operating voltage between the movable device with the measuring device and the components arranged in stationary fashion in an analysis machine is effected with as few faults and as reliably as possible and, in particular, that there are less frequent or absolutely no sudden partial or complete failures of the transfer.

SUMMARY

It is therefore an object of the invention to provide a more reliable measuring system for measuring a sample in an automated analysis machine, with the sample holding device being embodied in stationary fashion and the measuring device being arranged at a movable device in said measuring system.

According to the invention, this object is achieved by the subjects and methods described in the following.

Here, the invention proceeds from the thought that the transfer of data and/or an operating voltage between a movable measuring device and components arranged in stationary fashion in an analysis machine may be carried out, for example, by way of a sliding contact system with sliding contacts. By way of example, a measuring system having such a sliding contact system has the design set forth in the following. The measuring system comprises a measuring device for recording measurement values of a measured variable and a first controller and a second controller for processing the measurement values and a sliding contact system with sliding contacts, wherein the measurement values are transferable from the measuring device to the first controller and then transferable from the first controller to the second controller via the sliding contacts.

The sliding contact system is an electromechanical component which, however, ages with time, in particular due to mechanical wear on the contacts. There may be faults, such as e.g., brief interruptions right up to a complete failure of the electrical contacts, with increasing age of the sliding contact system. Such faults are very problematic as they often occur suddenly and the entire analysis machine then is not available for measurements. This may lead to a lower reliability of the measuring system and of the analysis machine.

It is therefore a further idea of the invention that a more reliable measuring system may be made available if individual, sporadically occurring transfer errors during the transfer of measurement values from the first controller to the second controller via the sliding contacts are identified and if the transfer quality is analyzed. By way of example, increasing wear of the sliding contacts, for example, on account of advancing aging of same, may be deduced from the increased occurrence of transfer errors. This is advantageous in that the sliding contacts may be serviced or replaced in good time, before there are sudden defects, and the reliability of the measuring system is increased in this way.

The subject matter of the present invention is a measuring system for measuring a sample in an automated analysis machine. The measuring system comprises a measuring device for recording measurement values of a measured variable and a first controller and a second controller for processing the measurement values and a sliding contact system with sliding contacts. The measuring device and the first controller are movable relative to the second controller. The measurement values are transferable from the measuring device to the first controller and, then, transferable from the first controller to the second controller via the sliding contacts. The measuring system further comprises an error counter which captures the errors occurring during the transfer of measurement values from the first controller to the second controller via the sliding contacts.

This is advantageous in that a prediction about the expected remaining service life of the sliding contact system is rendered possible and, hence, sudden faults of the sliding contact system occur less frequently as the sliding contact system can be serviced or replaced in good time.

In an advantageous configuration of the measuring system, the power supply of the first controller and/or of the measuring device is effected by way of the sliding contacts. This is advantageous in that there is no need to arrange a separate power source in the form of, e.g., batteries on the controller and/or the measuring device; instead, the power supply may be effected directly by way of the sliding contacts of the sliding contact system.

In a further advantageous configuration of the measuring system, the first controller and the measuring device are rotatably mounted and the sliding contact system comprises a slip ring system. This is advantageous in that a multiplicity of samples can be arranged in a ring-shaped manner and measured in quick succession by means of a single measuring device.

In a further advantageous configuration of the measuring system, the second controller is arranged in stationary fashion. This is advantageous in that simple wiring of the second controller with further components of the analysis machine arranged in stationary fashion is possible.

In a further advantageous configuration of the measuring system, the measuring system comprises a controller area network bus system, preferably a controller area network bus system pursuant to ISO 11898, wherein the measurement values are transferred from the first controller to the second controller by means of the controller area network bus system and wherein the error counter is part of the bus system. This is advantageous in that the error counter for capturing the errors during the transfer of the measurement values from the first controller to the second controller via the sliding contacts may be provided in a particularly simple manner and with little outlay.

A controller area network (CAN) bus system pursuant to ISO 11898 is a serial bus system which operates according to the "multi-master principle" and connects a plurality of equal-access controllers. The CAN bus system comprises a method which resolves collisions (simultaneous bus access of a plurality of nodes) without a winning, higher-priority message being damaged. To this end, the bits—depending on state—are dominant or recessive (a dominant bit overwrites a recessive one). A so-called "CAN bus packet" consists of an identifier, up to 8 byte used data, a 16 bit checksum and further control bits. A cyclical redundancy check is used for securing data, the former generating the 16 bit checksum. A bus access is resolved in lossless fashion by means of bitwise arbitration on the basis of the identifiers of the messages to be transmitted. To this end, each transmitter monitors the bus just as it is transmitting the identifier. If two nodes transmit simultaneously, the first dominant bit of one of the two transmitters overwrites the corresponding recessive bit of the other one; this is identified by the transmitter of the recessive bit and it terminates its transfer attempt.

If a receiver identifies an error in the transfer, it transmits a so-called error frame and thus prompts all nodes to discard said frame. Should other nodes have identified this error condition, they in turn transmit a further error frame directly thereafter. This renders a further safety function of the CAN protocol possible. Each node contains error counters in order to avoid individual nodes permanently blocking the message transport as a result of incorrectly identified error conditions. These counters allow an incorrectly operating node to separate from the CAN bus in two stages of the operating state if it repeatedly identifies errors which are not identified by other nodes or if it repeatedly transmits erroneous frames. The stages are called "error active" (normal), "error passive" (node may only still transmit passive—i.e., recessive—error frames) and "bus off" (node may no longer transmit). The transmitter may also be separated from the bus by the aforementioned error counters if the data transfer continuously fails. After the error frame, the transmitter repeats its data transfer. A node is, for example, a transmitter and/or receiver. A transmitter and/or receiver is, for example, a controller in each case.

In a further advantageous configuration of the measuring system, the measuring device comprises a photometer which permits a photometric examination of the sample.

The term "photometric examination", as used in the present case, relates to absorption, reflection, diffraction, fluorescence, phosphorescence, chemiluminescence and/or scattering measurements using electromagnetic waves. Here, electromagnetic waves of the visible spectrum are thought about first (between approximately 350 nm and approximately 750 nm wavelength), but also waves in the infrared (IR) range (between approximately 750 nm and approximately 1 mm wavelength) and in the ultraviolet (UV) range (between approximately 350 nm and approximately 50 nm).

Further subject matter of the invention is a method for monitoring sliding contacts in an automated analysis machine, wherein the automated analysis machine comprises a measuring system according to the invention, said method comprising the following steps:

a) determining a sum S of the occurring errors by adding the occurring errors during the transfer of the measurement values from the first controller to the second controller via the sliding contacts over a predetermined time interval T, b) comparing the sum S of the occurring errors with a first predetermined threshold G, and c) outputting a warning that the sliding contacts or the sliding contact system needs servicing and/or replacement if the sum S is greater than the first threshold G, wherein steps a) and b) are carried out by means of the first controller and/or the second controller.

This is advantageous in that a prediction about the expected remaining service life of the sliding contact system is rendered possible and, hence, sudden faults of the sliding contact system occur less frequently as the sliding contact system can be serviced or replaced in good time.

By way of example, the threshold G may be ascertained empirically. To this end, e.g., a continuous test is carried out for the employed sliding contact system, which is operated until the sliding contact system exhibits signs of aging and indications of damage. Data are transmitted and received continuously and to the same extent via the CAN bus. The error counter of the rotating controller is read at fixed intervals. The difference from the preceding error count is read. If the difference is positive, the error counter has increased. The difference is summed to a global counter and forms the sum S. After completion of the test, the development of S over time is analyzed and a preferred value for the threshold G is ascertained therefrom. Advantageously, e.g., the development of S over time may be depicted graphically to this end.

Here, a value for the threshold G may be ascertained advantageously by virtue of the value of S at the start point of the last time interval, in which 30% of all errors lie, being set as the value of G, with, advantageously, the value of G being selected to be identical to the value of S.

Advantageously, the value of G is designed to be configurable, so as to render it possible to dynamically adapt the latter should, for example, more experience about the wearing properties of the sliding contact system be available at a later time.

The continuous test may advantageously be accelerated by virtue of the sliding contact system being moved to-and-fro or rotated, for example, at a higher frequency during the continuous test than in the case of normal operation.

The service life of a sliding contact system also depends, in particular, on the specific embodiment of the sliding contact system and the respective use conditions.

In an advantageous configuration of the method, the measuring system comprises a third controller, wherein steps a) and b) are carried out by means of the first controller, the second controller and/or the third controller. This is advantageous in that the analysis machine may be constructed in a flexible and modular fashion. Thus, for example, the third controller may also control further components of the analysis machine.

The second controller and/or third controller may advantageously be a commercially available personal computer (PC).

In a further advantageous configuration of the method, the measuring system comprises a controller area network bus system, preferably a controller area network bus system pursuant to ISO 11898, wherein the measurement values are transferred from the first controller to the second controller by means of the controller area network bus system.

In a further advantageous configuration of the method, the power supply of the first controller and/or of the measuring device is effected by way of the sliding contacts.

In a further advantageous configuration of the method, the first controller and the measuring device are rotatably mounted and the sliding contact system comprises a slip ring system.

In a further advantageous configuration of the method, the second controller is arranged in stationary fashion.

Further subject matter of the invention relates to an automated analysis machine comprising a measuring system according to the invention.

In an advantageous configuration of the analysis machine, the measuring system preferably comprises a third controller, wherein the first controller, the second controller and/or the third controller are configured in such a way that they are able to control a method according to the invention.

In a further advantageous configuration of the analysis machine, the automated analysis machine comprises a multiplicity of receiving positions for, in each case, a primary vessel, an aliquot vessel and/or a target vessel, and/or at least one automated pipetting apparatus with a robotically displaceable and/or robotically swivelable transfer arm.

In a preferred embodiment, an automated analysis machine comprises a multiplicity of machine components. The machine components are, for example, a disk-shaped transport and storage device for sample vessels, a disk-shaped transport and storage device for reagent containers, an incubation block, a photometer or any other component of the automated analysis machine required for processing samples.

In a further preferred embodiment, the sample is in a non-stationary cuvette and at least one, preferably at least two, machine components are configured as receiving positions for the cuvette. This is advantageous in that a multiplicity of samples and analyses may be worked through in a particularly flexible manner.

A measuring device fastened to a movable device is also referred to as movable measuring device.

Within the meaning of the invention, a "sample" should be understood to mean the material which presumably contains the substance to be detected (the analyte). In particular, the term "sample" comprises biological liquids of humans or animals, such as, e.g., blood, plasma, serum, sputum, exudate, bronchoalveolar lavage, lymph fluid, synovial fluid, semen, vaginal mucus, feces, urine, liquor, or else, e.g., tissue or cell culture samples prepared accordingly for photometric, preferably nephelometric, determination by homogenization or cell lysis. Furthermore, plant liquids or tissues, forensic samples, water and sewage samples, foodstuff, and pharmaceuticals may also serve as a sample which, possibly, should be subject to an appropriate sample pretreatment prior to the determination.

Within the scope of a quantitative detection, the amount, the concentration, or the activity of the analyte in the sample is measured. The term "quantitative detection" also comprises semi-quantitative methods, which only capture approximate amounts, concentrations, or activities of the analyte in the sample or which may only serve to specify a relative amount, concentration or activity. A qualitative detection should be understood to mean the general detection of the presence of the analyte in the sample or a display that the amount, concentration, or activity of the analyte in the sample lies above or below a specific threshold or a plurality of specific thresholds.

BRIEF DESCRIPTION OF THE DRAWINGS

The invention is explained in more detail in exemplary fashion on the basis of drawings. In the figures.

DETAILED DESCRIPTION

Figure 1:
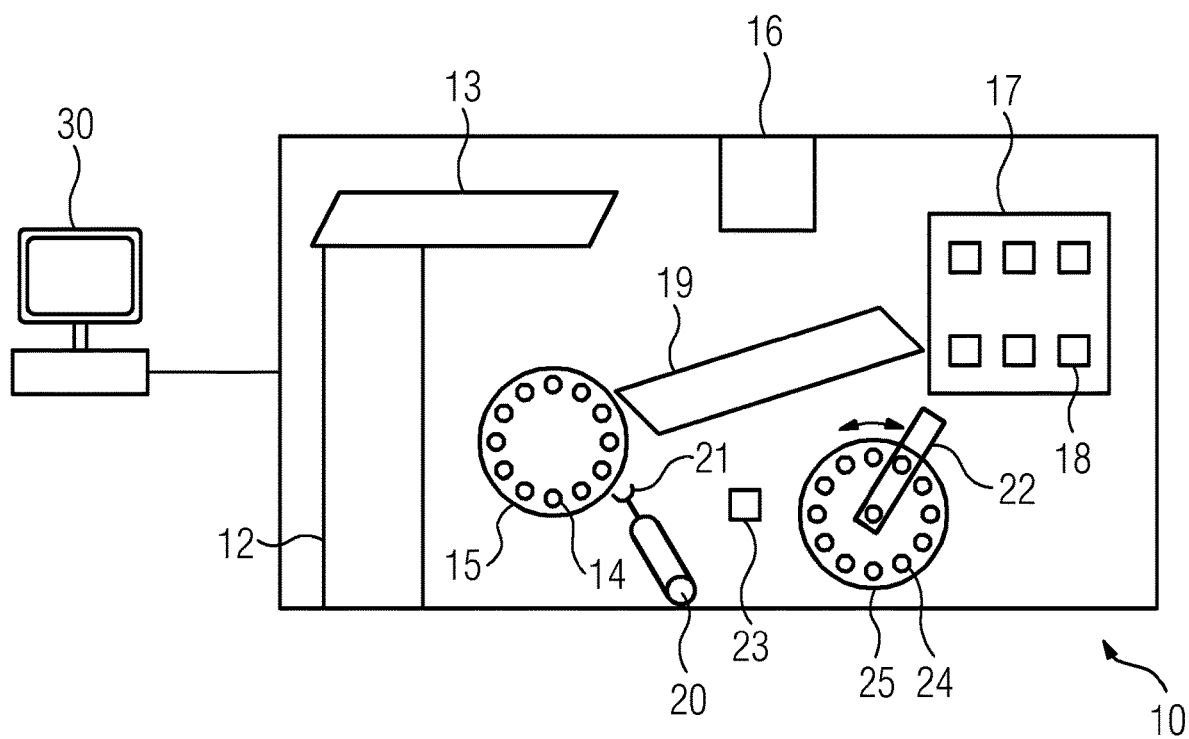
FIG. 1 shows an automated analysis machine according to the invention.

FIG. 1 shows a schematic illustration of an automated analysis machine (10) with some of the components contained therein. In order to explain the basic function of the automated analysis machine (10), only the most important components are depicted here in a much-simplified fashion, without representing the individual parts of each component in detail in the process.

The automated analysis machine (10) is embodied to carry out very different analyses of blood or other body samples in a fully automated manner, without activities of a user being required in this respect. Instead, necessary interventions of a user are restricted to servicing or repair and refill work, for example, if cuvettes need to be refilled or liquid containers need to be replaced.

The patient samples are supplied to the automated analysis machine (10) in primary sample vessels on carriages, not depicted in any more detail, by way of a supply rail (12). Information in respect of the analyses to be carried out for each sample may be transferred, for example, by means of barcodes attached to the sample vessels, said barcodes being read in the automated analysis machine (10). With the aid of a first pipetting apparatus (13), sample aliquots are taken from the sample vessels by means of a pipetting needle.

The sample aliquots are likewise supplied in cuvettes, which are not depicted in any more detail and which are arranged in receiving positions (14) of a rotatable incubation device (15), the temperature of which is controlled to 37° C. The cuvettes are taken from a cuvette storage container (16), in which the cuvettes are available as bulk material in an unordered fashion. Only when an individual cuvette is removed and said cuvette is placed into a receiving position (14) is a data record created for said cuvette, said data record initially containing the information that this is a cuvette and information in respect of the receiving position in which it is placed. Reagent vessels (18) with different reagent liquids are stored in the reagent vessel storage container (17), which is cooled to approximately 8-10° C. Reagent liquid is taken from a reagent vessel (18) by means of the pipetting needle of a second pipetting apparatus (19) and dispensed for the purposes of providing a reaction mix in a cuvette which already contains a sample aliquot. The cuvette with the reaction mix is taken from a receiving position (14) of the incubation device (15) by the transfer arm (20) with a gripper (21) and transferred to a shaking device (23) for mixing the reaction mix. After completion of the mixing process, the cuvette is transported onward to a receiving position (24) of the receiving apparatus (25) for a measuring device, which comprises a photometer (22) for the photometric examination of the sample, where the absorbance of the reaction mix is measured. Here, the photometer (22) is designed to be turnable or, preferably, rotatable in at least one of the two directions, depicted by the arrows, about an axis arranged centrally in respect of the receiving apparatus 25.

The entire process is controlled by a control unit (30), such as, e.g., a computer connected by way of a data line, supported by a multiplicity of further electronic circuits and microprocessors, not depicted in any more detail, within the automated analysis machine (10) and the components thereof. Here, the control unit (30) comprises one controller, but it may also comprise two or more controllers in further embodiments.

Figure 2:
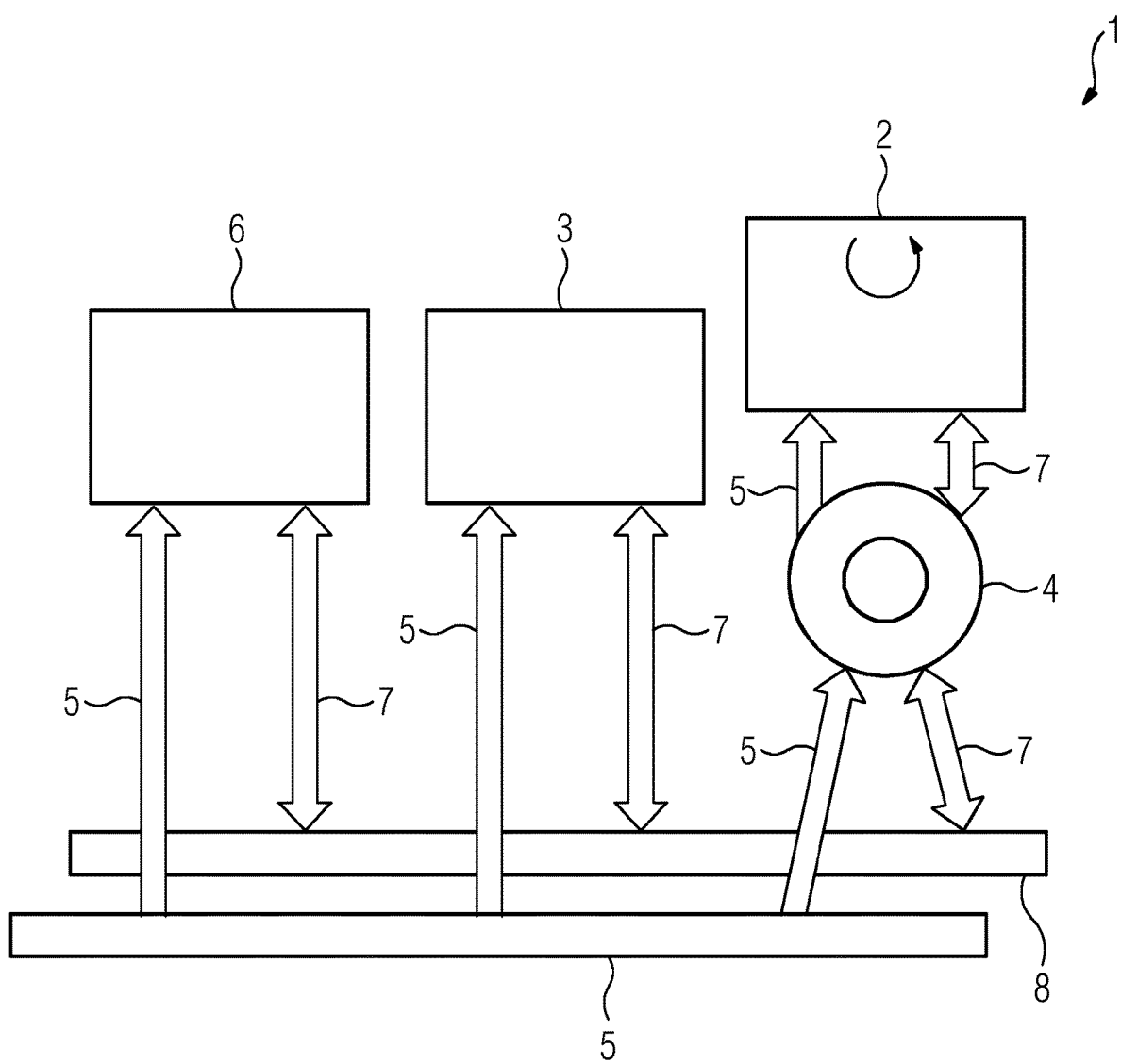
FIG. 2 shows a schematic illustration of a measuring system for measuring a sample in an automated analysis machine.

The measuring device with the photometer (22) is part of a measuring system (1), which is described in more detail in FIG. 2.

The measuring system (1) depicted schematically in FIG. 2 is embodied to measure a sample in an automated analysis machine (10), as depicted in FIG. 1 in an exemplary manner. The measuring system (1) comprises a measuring device (not depicted here) for recording measurement values of a measured variable and a first controller (2), a second controller (3) and a third controller (6) for processing the measurement values, and a slip ring (4) with sliding contacts. The measurement values are initially transferred from the measuring device to the first controller (2). Subsequently, the measurement values are transferred to the second controller (3) and third controller (6) from the first controller (2) via the sliding contacts of the slip ring (4). The measuring system (1) contains an error counter, which captures the errors which occur during the transfer of the measurement values from the first controller (2) to the second controller (3) or third controller (6) via the sliding contacts. The measuring system (1) furthermore comprises a power supply (5), by means of which the controllers (2, 3, 6) and the measuring device are supplied with electric power for their operation. Graphically depicted is the path of the data (7), e.g., the measurement values, and the electric power. The data (7) and/or electric power is transferred between the controllers (2, 3, 6) by way of a controller area network bus system (8) pursuant to ISO 11898.

LIST OF REFERENCES

1 Measuring system
2 First controller
3 Second controller
4 Slip ring system
5 Power supply
6 Third controller
7 Data
8 Controller area network bus system
10 Analysis machine
12 Supply rail
13 Pipetting apparatus
14 Receiving position
15 Incubation device
16 Cuvette storage container
17 Reagent vessel storage container
18 Reagent vessel
19 Pipetting apparatus
20 Transfer arm
21 Gripper
22 Photometer
23 Mixing device
24 Receiving position
25 Receiving apparatus
30 Control unit

What is claimed is:

1. A measuring system for measuring a sample in an automated analysis machine, the measuring system comprising a measuring device for recording measurement values of a measured variable and a first controller and a second controller for processing the measurement values, wherein the measuring device and the first controller are movable relative to the second controller, and the measurement values are transferable from the measuring device to the first controller, wherein:
   the measuring system comprises a sliding contact system having sliding contacts,
   the measurement values are transferable from the first controller to the second controller via the sliding contacts,
   the measuring system comprises an error counter for capturing errors occurring during a transfer of measurement values from the first controller to the second controller via the sliding contacts, and
   the first controller or the second controller is configured to output a warning that the sliding contacts or the sliding contact system needs servicing or replacement in response to a number of errors captured by the error counter exceeding a threshold ascertained via a continuous test of the measuring system operated until the sliding contact system exhibits indications of damage.

2. The measuring system as claimed in claim 1, wherein a power supply of the first controller or the measuring device is effected by the sliding contacts.

3. The measuring system as claimed in claim 1, wherein the first controller and the measuring device are rotatably mounted and the sliding contact system comprises a slip ring system.

4. The measuring system as claimed in claim 1, wherein the second controller is stationary.

5. The measuring system as claimed in claim 1, further comprising a controller area network bus system, wherein the measurement values are transferred from the first controller to the second controller via the controller area network bus system.

6. The measuring system as claimed in claim 1, further comprising a controller area network bus system pursuant to ISO 11898.

7. The measuring system as claimed in claim 1, wherein the measuring device comprises a photometer for a photometric examination of the sample.

8. An automated analysis machine comprising the measuring system as claimed in claim 1 and a multiplicity of receiving positions for a respective multiplicity of vessels.

9. The automated analysis machine as claimed in claim 8, wherein the measuring system comprises a third controller and at least one of the first controller, the second controller, and the third controller is configured to:
determine a sum S of the errors by adding the errors occurring during the transfer of the measurement values from the first controller to the second controller via the sliding contacts over a predetermined time interval T,
compare the sum S of the errors with the threshold, and
output a warning that the sliding contacts or the sliding contact system needs servicing or replacement if the sum S is greater than the threshold.

10. The automated analysis machine as claimed in claim 8, wherein the multiplicity of receiving positions is configured for, in each case, a primary vessel, an aliquot vessel, or a target vessel, the automated analysis machine further comprising at least one automated pipetting apparatus with a robotically displaceable or robotically swivelable transfer arm.

11. The measuring system as claimed in claim 1, wherein the error counter comprises a global counter that sums a positive difference in an error count by a first error counter from a preceding error count by the first error counter, the first error counter read at fixed intervals.

12. The measuring system as claimed in claim 11, wherein the first controller comprises the first error counter and is rotatably mounted in the measuring system.

13. The measuring system as claimed in claim 11, wherein the threshold equals a sum of counted errors at a start point of a time interval in which 30% of all counted errors lie.

14. The measuring system as claimed in claim 1, wherein the continuous test of the measuring system is operated such that the sliding contact system is moved or rotated at a higher frequency than normal operation of the measuring system.

15. A method for monitoring sliding contacts in an automated analysis machine, wherein the automated analysis machine comprises a measuring system, the method comprising:
(a) determining a sum S of errors occurring during a transfer of measurement values from a first controller of the measuring system to a second controller of the measuring system via the sliding contacts of a sliding contact system of the measuring system by adding the errors during the transfer of the measurement values over a predetermined time interval T,
(b) comparing the sum S of the errors with a first predetermined threshold G, the predetermined threshold G ascertained via a continuous test of the measuring system operated until the sliding contact system exhibits indications of damage, and
(c) outputting a warning that the sliding contacts or the sliding contact system needs servicing or replacement if the sum S is greater than the first predetermined threshold G,
wherein (a) and (b) are carried out by the first controller or the second controller.

16. The method as claimed in claim 15, wherein the measuring system comprises a third controller and wherein (a) and (b) are carried out by the first controller, the second controller, or the third controller.

17. The method as claimed in claim 15, wherein the measuring system comprises a controller area network bus system, and the measurement values are transferred from the first controller to the second controller by the controller area network bus system.

18. The method as claimed in claim 15, wherein a power supply of the first controller or the measuring device is effected by the sliding contacts.

19. The method as claimed in claim 15, wherein the first controller and the measuring device are rotatably mounted, and the sliding contact system comprises a slip ring system.

20. The method as claimed in claim 15, wherein the second controller is stationary.

* * * * *